United States Patent
Safavi

(10) Patent No.: US 8,290,458 B2
(45) Date of Patent: Oct. 16, 2012

(54) SYSTEM AND METHOD FOR IQ IMBALANCE ESTIMATION USING LOOPBACK WITH FREQUENCY OFFSET

(75) Inventor: Saeid Safavi, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 1109 days.

(21) Appl. No.: 12/165,526

(22) Filed: Jun. 30, 2008

(65) Prior Publication Data

US 2009/0325516 A1    Dec. 31, 2009

(51) Int. Cl.
*H04B 1/12*    (2006.01)
(52) U.S. Cl. ............... 455/226.1; 455/296; 375/296
(58) Field of Classification Search .......... 455/47, 455/109, 114.2, 114.3, 115.1, 115.2, 126, 455/203, 214, 226.1, 227, 296, 302, 305, 455/310, 324, 334; 375/221, 296, 346
See application file for complete search history.

(56) References Cited

U.S. PATENT DOCUMENTS

| | | | |
|---|---|---|---|
| 6,628,735 B1 | 9/2003 | Belotserkovsky et al. | |
| 7,180,850 B2 | 2/2007 | Langley et al. | |
| 7,184,714 B1* | 2/2007 | Kutagulla et al. | 455/73 |
| 7,606,332 B2* | 10/2009 | Isaac et al. | 375/332 |
| 7,856,048 B1* | 12/2010 | Smaini et al. | 375/221 |
| 2004/0196925 A1 | 10/2004 | Moore et al. | |
| 2004/0203472 A1 | 10/2004 | Chien | |
| 2007/0135064 A1* | 6/2007 | Ruelke et al. | 455/110 |
| 2007/0275674 A1* | 11/2007 | Chien | 455/90.2 |

FOREIGN PATENT DOCUMENTS
EP    1791310 A1    5/2007
* cited by examiner

*Primary Examiner* — Blane J Jackson
(74) *Attorney, Agent, or Firm* — Bruce W. Greenhaus; Daniel N. Yannuzzi; Michael A. Febbo

(57) ABSTRACT

Systems and methods for estimating IQ imbalance in a communication system are provided. In various embodiments, a device is configured to perform a self-characterization. The self-characterization is performed over an RF loopback circuit. In some embodiments, a probe is transmitted over the RF loopback circuit. The probe uses a frequency offset such that an image related to one IQ imbalance is separated from an image related to another IQ imbalance. An imbalance estimate is calculated based on processing of the probe.

18 Claims, 14 Drawing Sheets

SYSTEM AND METHOD FOR IQ IMBALANCE ESTIMATION USING LOOPBACK WITH FREQUENCY OFFSET

TECHNICAL FIELD

The disclosed method and apparatus relates to communication systems, and more particularly, some embodiments relate to IQ imbalance in communications systems.

DESCRIPTION OF THE RELATED ART

With the continued increase in levels of integration in semiconductor devices and the constant drive to reduce power consumption, size and cost, while increasing capabilities, designers of contemporary communications devices are facing numerous challenges. Wired and wireless communication devices are no exception. In traditional broadcast systems where one device is broadcasting to many receivers, it is possible, and often practical, to design the broadcasting system to more rigorous specifications. However, in a distributed network or other like environment, it is not always commercially practical to design each of the devices to the highest standards. Accordingly, in contemporary communication devices, a low-cost, practical implementation of the physical layer presents a unique challenge in view of variations associated with the device componentry.

One such challenge involves the imbalance that typically occurs between the in-phase (I) and quadrature-phase (Q) branches when the received radio-frequency (RF) signal is down-converted to baseband. Similarly at a transmitter IQ imbalance can be introduced during frequency up-conversion from baseband to RF. IQ imbalance can be the result of "amplitude", "phase" and "delay" mismatch between the I & Q branches in quadrature heterodyne communications. Particularly, in typical communication systems, the gain and phase responses of the I and Q branches can be different from one another, resulting in signal distortion. The IQ imbalances can limit the achievable operating signal-to-noise ratio (SNR) at the receiver, which can adversely impact constellation sizes and data rates. This imbalance can occur with both heterodyne receivers as well as with the so-called zero-IF, or direct-conversion receivers. Although the direct conversion receiver is preferable for low-cost and power-sensitive applications, it tends to be more sensitive to IQ imbalance. With IQ imbalances, translated spectral components from both the desired frequency bin and the associated "image" frequency bin come into play, although the former usually dominate.

BRIEF SUMMARY OF EMBODIMENTS OF THE DISCLOSED METHOD AND APPARATUS

The disclosed method and apparatus is directed toward systems and methods for estimating IQ imbalance in a communication system. In various embodiments, a device is configured to perform a self-characterization. The self-characterization is performed over an RF loopback circuit. For example, in one embodiment, a transmitter in a communication device is connected to a receiver in the same device, in this way, a transmitted signal is looped back within the device. Accordingly, the device can characterize the transmitter, the receiver or both using the looped back signal.

In some embodiments, a probe is transmitted over the RF loopback circuit. The probe uses a frequency offset such that an image of a tone (image) related to one IQ imbalance is separated from an image related to another IQ imbalance. For example, in various embodiments the frequency offset comprises 10 bins, 20 bins, or more. For example, some embodiments may use 64 bins. In general, the number of bins should be large enough so that the images and tones do not interfere in each computation. Other frequency offsets are also possible, depending on the particular implementation.

In one example, a large frequency offset is used to limit the effect of transmit imbalance and receive imbalance. Accordingly, averaging is not needed to remove these effects. This can increase the speed and performance of various devices implementing these methods. Averaging can, however, be applied to the systems and methods described herein to account for noise in, for example, received probes. Additionally, because of the large frequency offset, in some embodiments, both the transmit and the receive imbalance can be computed separately and simultaneously. In one embodiment, this is done by comparing the ratio of appropriate image components and the received tone by sending fixed probes. In various embodiments, the number of transmitted probes is determined based on the receiver noise level. For example, more probes can be transmitted if the receiver has a high noise level.

An imbalance estimate is calculated based on the probe or probes. In some embodiments, the imbalance estimate includes an IQ gain imbalance, an IQ phase imbalance, an IQ delay imbalance or some combination of these. These imbalance estimate may be transmitter IQ imbalance estimates, receive IQ imbalance estimates, or both. Additionally, the transmitter IQ imbalance and the receiver IQ imbalance can also be estimated simultaneously.

In some embodiments, the large frequency offset is generated using a dedicated phase locked loop (PLL) that is not constrained by tight phase noise requirements. This may decrease cost, complexity and size.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the invention, which is defined solely by the claims attached hereto.

BRIEF DESCRIPTION OF THE DRAWINGS

The disclosed method and apparatus, in accordance with one or more various embodiments, is described in detail with reference to the following figures. The drawings are provided for purposes of illustration only and merely depict typical or example embodiments of the disclosed method and apparatus. These drawings are provided to facilitate the reader's understanding of the disclosed method and apparatus and shall not be considered limiting of the breadth, scope, or applicability of the claimed invention. It should be noted that for clarity and ease of illustration these drawings are not necessarily made to scale.

The figures are not intended to be exhaustive or to limit the disclosed method and apparatus to the precise form disclosed. It should be understood that the disclosed method and apparatus can be practiced with modification and alteration, and that the disclosed method and apparatus be limited only by the claims and the equivalents thereof.

DETAILED DESCRIPTION OF THE EMBODIMENTS OF THE DISCLOSED METHOD AND APPARATUS

The disclosed method and apparatus is directed toward systems and methods for estimating IQ imbalance in a communication system. In various embodiments, a device is configured to perform a self-characterization. The self-characterization is performed over an RF loopback circuit. In some embodiments, a probe is transmitted over the RF loopback circuit. The probe is transmitted with a large frequency offset. This is sometimes referred to as "excess frequency offset."

In various embodiments, the probe uses an excess frequency offset such that an image related to one IQ imbalance is separated from an image related to another IQ imbalance. An imbalance estimate is calculated based on the probe. In some embodiments the frequency offset comprises, for example 10 bins, 20 bins or more. For example, some embodiments may use 64 bins. In general, the number of bins should be large enough so that the images and tones do not interfere in each computation. Other frequency offsets are also possible, depending on the particular implementation.

The imbalance estimate can include a gain imbalance, a phase imbalance or a delay imbalance. Additionally, in various embodiments, the imbalance estimate includes transmitter IQ imbalance estimation or receiver IQ imbalance estimation. The transmitter IQ imbalance and the receiver IQ imbalance can also be estimated simultaneously.

Figure 1:
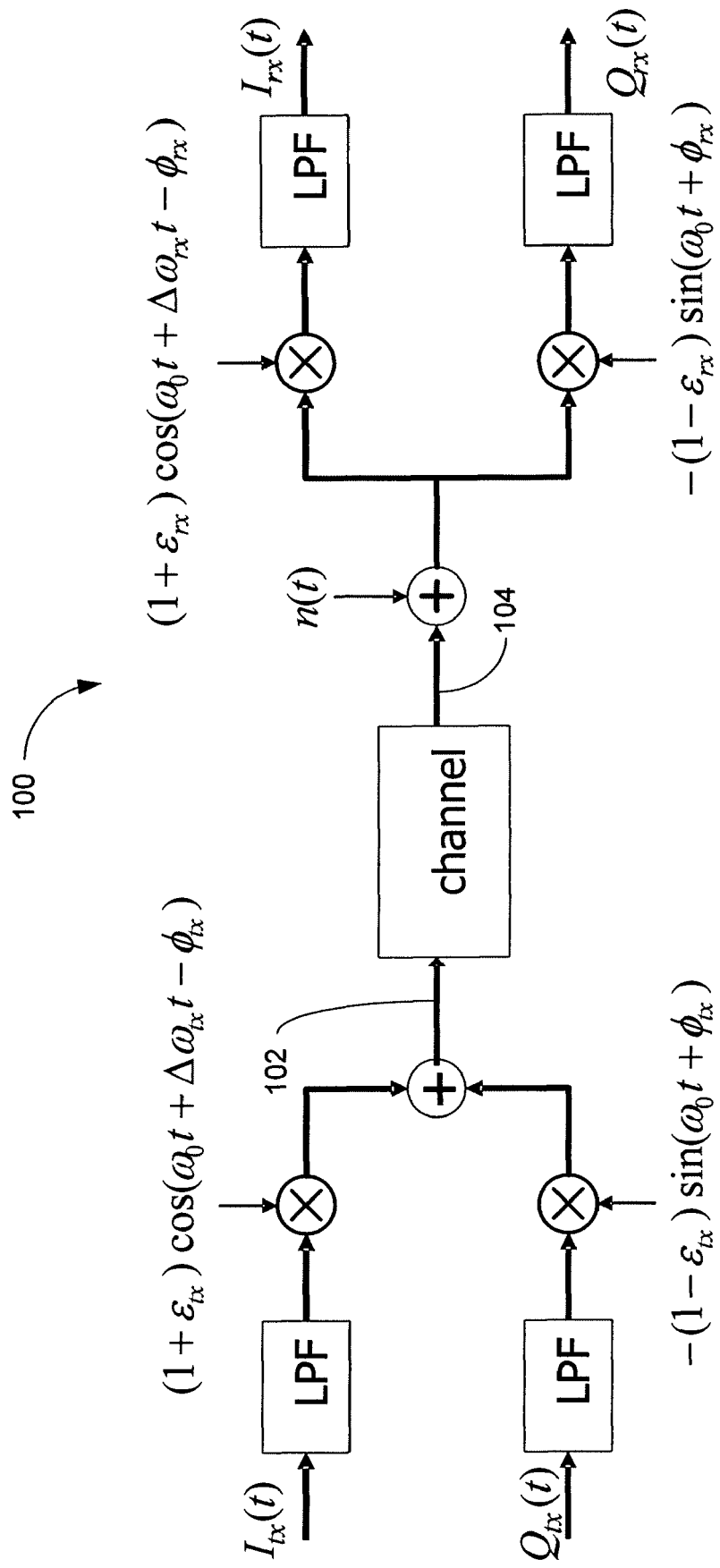
FIG. 1 is a diagram illustrating an example time-domain model with both transmit and receive included.

FIG. 1 is a diagram illustrating an example time-domain model 100 with both transmit and receive included. Referring now to FIG. 1, for a system to have no IQ imbalance, the effective sine and cosine waveforms performing up-conversion and down-conversion need to be orthogonal, i.e., having 90° phase difference and the same amplitude. In addition, the time delay and gain that each branch experiences should be equal. Because these waveforms are never exactly orthogonal and the time delay and gain are never exactly equal, real-world systems will have some form of IQ imbalance. These IQ imbalances can be modeled as illustrated in FIG. 1.

In the absence of Tx-Rx frequency offset the baseband equivalent model of the output of the transmit up-conversion imbalance model 102 can be modeled as $p(t)=\mu_{tx}x(t)+v_{tx}x^*(t)$ where $\mu_{tx}=[\cos(\phi_{tx})-j\epsilon_{tx}\sin(\phi_{tx})]$ and $v_{tx}=[\epsilon_{tx}\cos(\phi_{tx})-j\sin(\phi_{tx})]$ while the output of the receive down-conversion imbalance model 104 can be modeled as $z(t)=\mu_{rx}y(t)+v_{rx}y^*(t)$ where $\mu_{rx}=[\cos(\phi_{rx})+j\epsilon_{rx}\sin(\phi_{rx})]$ and $v_{rx}=[\epsilon_{rx}\cos(\phi_{rx})-j\sin(\phi_{rx})]$. From this, and taking into account the effect of frequency offset, it can be shown that when an input b(t) is input into the time-domain imbalance model 100 the output can be modeled as $$b'_{rx-tx}(t) = \mu_{rx}C_k\mu_{tx}e^{j\Delta\omega t}e^{j\omega_k t} + \mu_{rx}C_{-k}v_{tx}e^{j\Delta\omega t}e^{-j\omega_k t} + v_{rx}C_k^*\mu_{tx}^*e^{-j\Delta\omega t}e^{-j\omega_k t} + v_{rx}C_{-k}^*v_{tx}^*e^{-j\Delta\omega t}e^{j\omega_k t}.$$

The tone frequency components are made up of two signals, a signal with a gain of $\mu_{rx}C_k\mu_{tx}$ shifted upward by the value $\Delta\omega=\Delta\omega_{tx}-\Delta\omega_{rx}$ and a signal with a gain of $v_{rx}C^*_{-k}v^*_{tx}$ shifted downward by the value $\Delta\omega=\Delta\omega_{tx}-\Delta\omega_{rx}$. The image frequency components are also made up of two signals, a signal with a gain of $\mu_{rx}C_{-k}v_{tx}$ upward shifted by the value $\Delta\omega=\Delta\omega_{tx}-\Delta\omega_{rx}$ and a signal with a gain of $v_{rx}C^*_k\mu^*_{tx}$ downward shifted by the value $\Delta\omega=\Delta\omega_{tx}-\Delta\omega_{rx}$. These signals are illustrated in FIG. 2.

Figure 2:
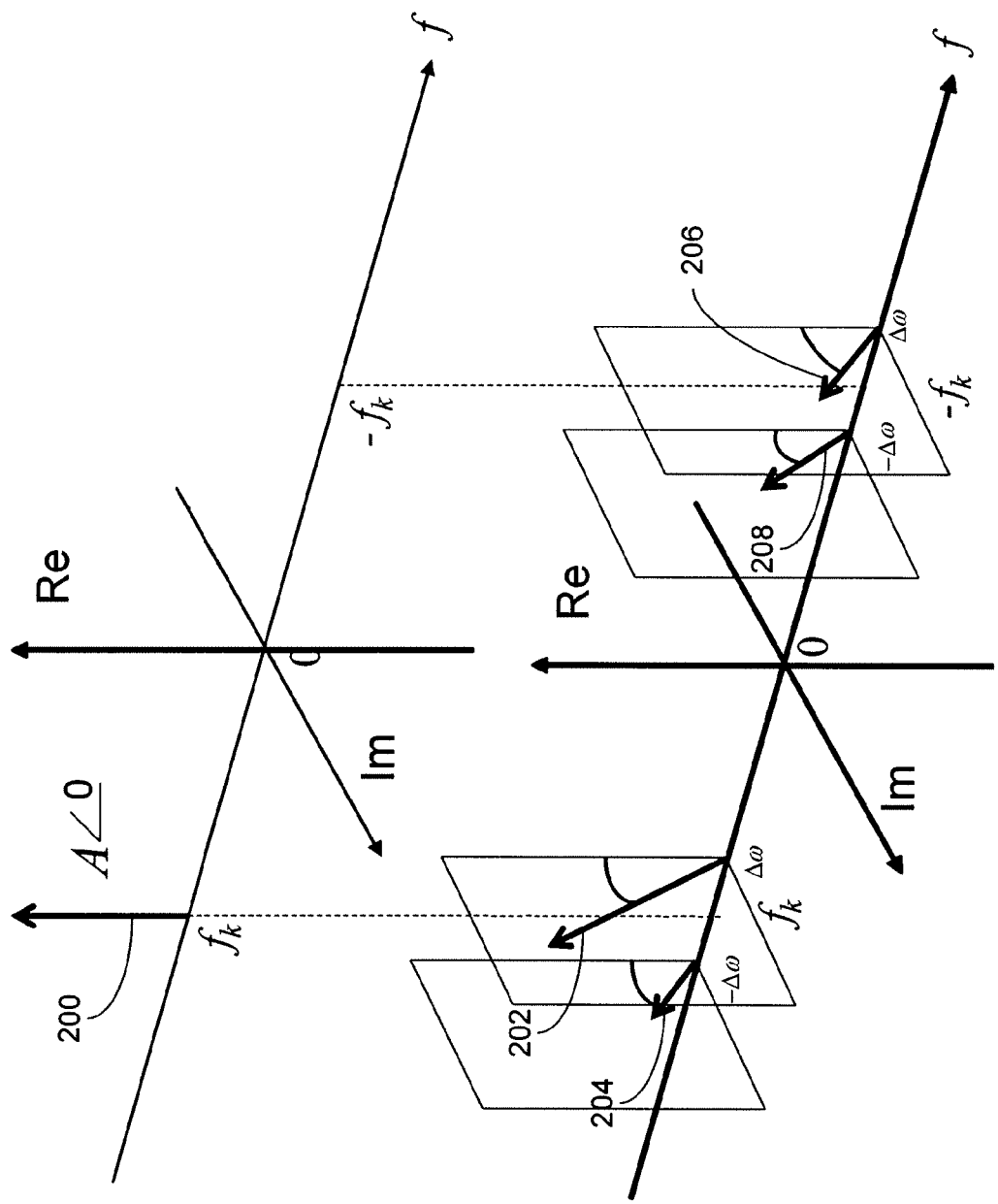
FIG. 2 is a diagram illustrating an example of the effect of transmit-receive IQ imbalance on a single tone.

FIG. 2 is a diagram illustrating an example of the effect of transmit-receive IQ imbalance on a single tone. Referring now to FIG. 2, when a signal 200 is transmitted using a system conforming to the time-domain imbalance model 100 illustrated in FIG. 1 four signals will be received. As discussed above, a signal 202 with gain of $\mu_{rx}C_k\mu_{tx}$ upward shifted by the value of $\Delta\omega=\Delta\omega_{tx}-\Delta\omega_{rx}$ and a signal 204 with gain of $v_{rx}C^*_{-k}v^*_{tx}$ downward shifted by the value of $\Delta\omega=\Delta\omega_{tx}-\Delta\omega_{rx}$ will be present. Additionally, a signal 206 with gain of $\mu_{rx}C_{-k}v_{tx}$ upward shifted by the value of $\Delta\omega=\Delta\omega_{tx}-\Delta\omega_{rx}$ and a signal 208 with gain of $v_{rx}C^*_k\mu^*_{tx}$ downward shifted by the value of $\Delta\omega=\Delta\omega_{tx}-\Delta\omega_{rx}$ will also be present.

The channel gain $C_k$ and the $\mu$ terms are generally close to 1. The product of these terms is also generally near 1. Accordingly, the signal gain is close to 1, but not equal to 1. A frequency offset, $\Delta\omega$, caused by the IQ imbalance is also present. The systems and methods described herein can be used to determine the gain, phase and delay IQ imbalance caused by these real-world systems.

In a loopback system the channel gain $C_k$ will generally be close enough to 1 to be treated as equal to 1. Accordingly, a loopback system with input b(t) can be modeled as:

$$b'_{rx-tx}(t) = \mu_{rx}\mu_{tx}e^{j\Delta\omega t}e^{j\omega_k t} + \mu_{rx}v_{tx}e^{j\Delta\omega t}e^{-j\omega_k t} + v_{rx}\mu_{tx}^*e^{-j\Delta\omega t}e^{-j\omega_k t} + v_{rx}v_{tx}^*e^{-j\Delta\omega t}e^{j\omega_k t}.$$

The gain, phase and delay IQ imbalance can be calculated using these parameters.

Figure 3:
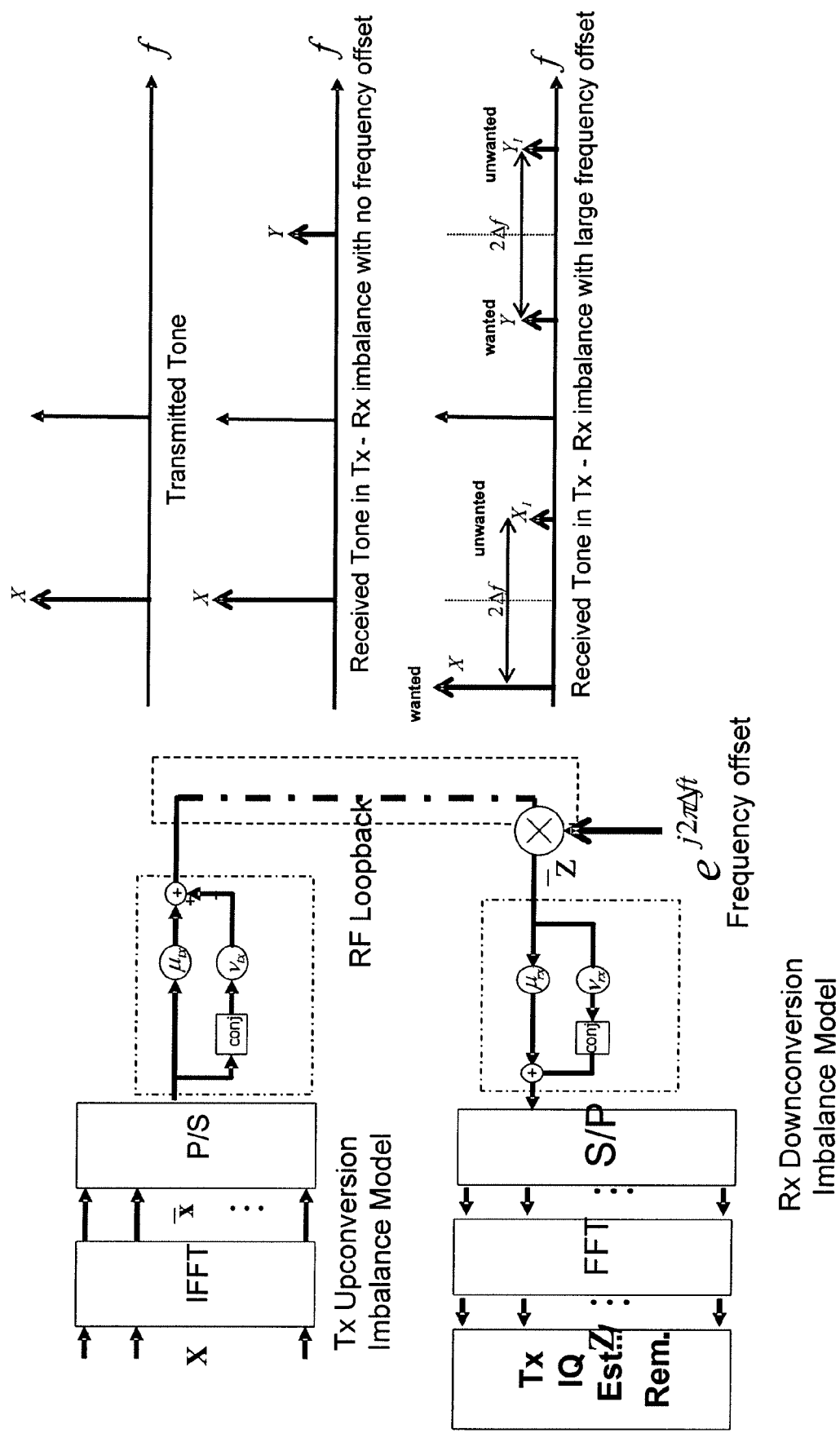
FIG. 3 is a diagram illustrating estimation of the transmitter IQ imbalance.

FIG. 3 is a diagram illustrating an example of estimation of the transmitter IQ imbalance in positive frequency offset. It will be understood by those of skill in the art that estimation of the transmitter IQ imbalance can also be done using negative frequency offset. Referring now to FIG. 3, in one embodiment, the transmitter imbalance is estimated by sending an IQ probe that includes two tones at fixed locations. The large frequency offset allows for interference free computation of transmitter IQ imbalance parameters. For example, in one embodiment the frequency offset is 1/10 the bandwidth. This is on the order of tens of bins in some systems.

In FIG. 3 tones are illustrated as impulses. In actuality, each tone and its images are sinc functions. These sync functions have a main pulse width of 2*bin-size. Additionally, the sinc functions can interfere with each other if they are not separated in frequency. Accordingly, in one embodiment, the frequency offset can be selected to be large enough so that the image related to the receiver IQ imbalance is moved far away, in frequency, from the image of the transmitter IQ imbalance. By using an excess frequency offset the image ratio ($Y_T/X$) is a close approximation of the transmitter gain and total phase imbalance.

As discussed above, because various embodiments of the systems and methods described herein use a loopback any effects of the channel will be negligible. Accordingly, $C_k=1$. With $C_k=1$ the signal 202 is $X_W=\mu_{rx}\mu_{tx}e^{j\Delta\omega t}$ and the signal 206 is $Y_T=\mu_{rx}v_{tx}e^{j\Delta\omega t}$. Accordingly, the ratio of $$\frac{Y_T}{X_W}$$

is:

$$\frac{Y_T}{X_W} = \frac{\mu_{rx}v_{tx}e^{j\Delta\omega t}}{\mu_{rx}\mu_{tx}e^{j\Delta\omega t}} = \frac{v_{tx}}{\mu_{tx}} \approx \varepsilon_{tx} - j\varphi_{tx}$$

Figure 4:
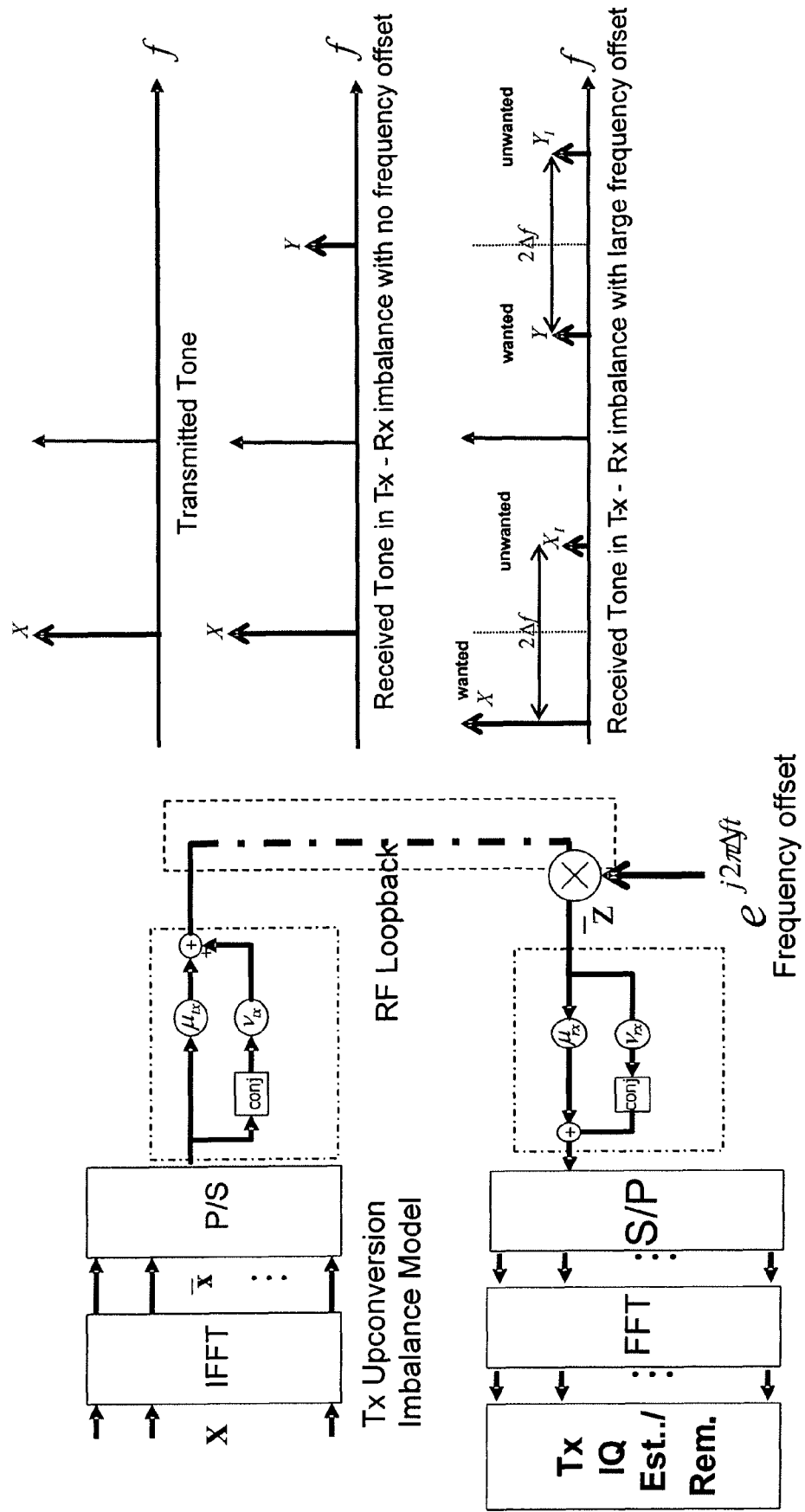
FIG. 4 is a diagram illustrating estimation of the receiver IQ imbalance.

FIG. 4 is a diagram illustrating estimation of the receiver IQ imbalance. Referring now to FIG. 4, by using the systems and methods described herein, the receiver imbalance can be computed independent of the transmitter imbalance. This is done using an algorithm similar to the transmitter imbalance algorithm. By using an excess frequency offset the image ratio ($Y_R/X^*$) is a close approximation of the transmitter gain and total phase imbalance. With $C_k=1$ the signal 208 is $Y_R=v_{rx}\mu^*_{tx}e^{-j\Delta\omega t}$ and the signal 202 is $X_W=\mu_{rx}\mu_{tx}e^{j\Delta\omega t}$. Accordingly $$\frac{Y_R}{X_W^*} = \frac{\mu_{tx}^*v_{rx}e^{-j\Delta\omega t}}{[\mu_{rx}\mu_{tx}e^{j\Delta\omega t}]^*} = \frac{v_{rx}}{\mu_{rx}^*} \approx \varepsilon_{rx} - j\phi_{rx}.$$

Figure 5:
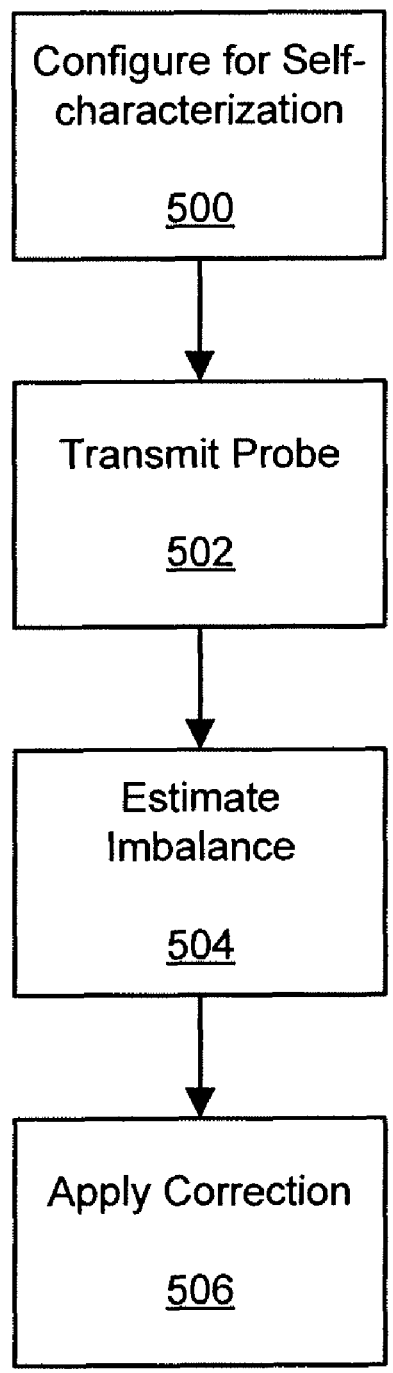
FIG. 5 is a flowchart illustrating an example method in accordance with one embodiment.

FIG. 5 is a flowchart illustrating an example method in accordance with various embodiments. Referring now to FIG. 5, in a step 500, a device is configured to perform a self-characterization. In some embodiments, the self-characterization can be performed over an RF loopback circuit. An example RF loopback circuit is illustrated in FIGS. 3 and 4. As illustrated, a transmitter in a communication device is connected to a receiver in the same device, allowing the device to characterize transmitter IQ imbalance, receiver IQ imbalance or both.

In a step 502, a probe is transmitted over the RF loopback circuit. The probe comprises a frequency offset such that an image related to one IQ imbalance is separated from an image related to another IQ imbalance. For example, in some embodiments, a large frequency offset is used to limit the effect of transmit imbalance and receive imbalance. Accordingly, averaging is not needed to remove the effects of transmit or receive imbalance.

In a step 504, an imbalance estimate is calculated based on the probe or probes. For example, the imbalance estimate may include a gain imbalance, a phase imbalance, a delay imbalance or some combination of these. Additionally, in one embodiment, the imbalance estimate includes a transmitter IQ imbalance estimate or a receiver IQ imbalance estimate.

The transmitter IQ imbalance and the receiver IQ imbalance can also be estimated simultaneously.

Various embodiments of the systems and methods described herein may be used to estimate IQ imbalance, however, in some embodiments IQ imbalance can also be corrected. For example, IQ imbalance as seen at the receiving node of an OFDM communication link contains the combined effect of transmitter and receiver imbalances. It can be shown that every received tone paired with its image (Z(k, l), Z(−k, l), at subcarrier index k and symbol number l) at the receiver of an OFDM modem and after down conversion, is related to the pre-IQ distorted transmitted tone pair [X(k, l), X(−k, l), at subcarrier index k and symbol number l] by:

$$\begin{bmatrix} Z(k,l) \\ Z^*(-k,l) \end{bmatrix} = K_{rx}\begin{bmatrix} Y(k,l) \\ Y^*(-k,l) \end{bmatrix} = K_{rx}CK_{tx}\begin{bmatrix} X(k,l) \\ X^*(-k,l) \end{bmatrix}$$

$$\begin{bmatrix} Y(k,l) \\ Y^*(-k,l) \end{bmatrix} = CK_{tx}\begin{bmatrix} X(k,l) \\ X^*(-k,l) \end{bmatrix}$$

is the received signal before Rx IQ distortion and;

$$K_{rx} = \begin{bmatrix} \mu_{rx} & v_{rx} \\ v_{rx}^* & \mu_{rx}^* \end{bmatrix}$$

is the Rx IQ imbalance matrix and, $$K_{tx} = \begin{bmatrix} \mu_{tx} & v_{tx} \\ v_{tx}^* & \mu_{tx}^* \end{bmatrix}$$

is the Tx IQ imbalance matrix, $$C = \begin{bmatrix} C(k) & 0 \\ 0 & C^*(-k) \end{bmatrix}C(k)$$

is the channel at tone index k and is assumed stationary. These parameters can be used to correct for various IQ imbalances in a communication device.

Figure 6:
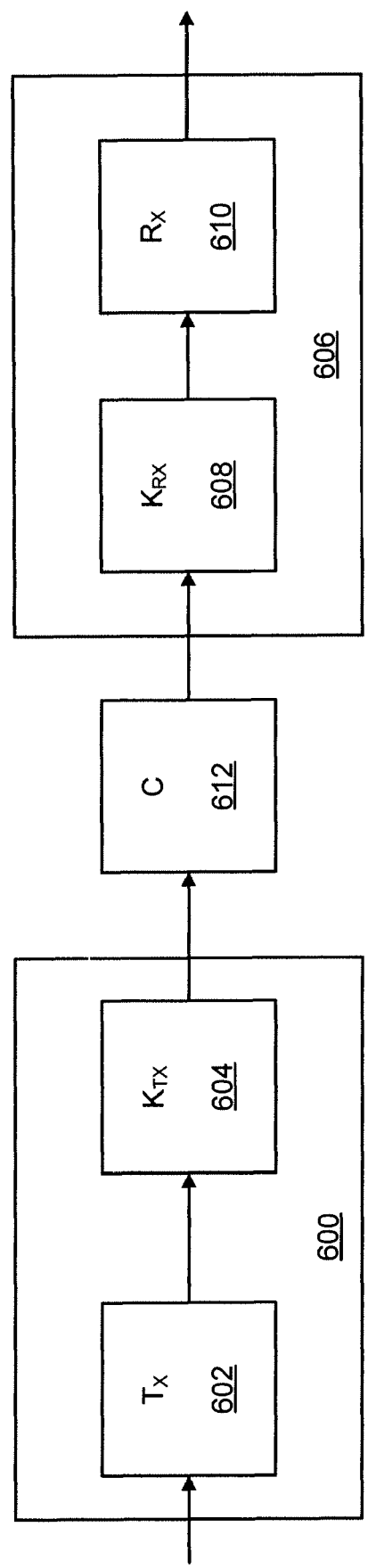
FIG. 6 is a diagram illustrating IQ imbalance correction at the receiver.

FIG. 6 is a diagram illustrating IQ imbalance correction at the receiver. Referring now to FIG. 6, a transmission block 600 includes a transmitter 602 and a transmit IQ imbalance correction block 604. In various embodiments, the correction block 604 is used to remove the IQ imbalance caused by the transmitter 602.

When signals $$\begin{bmatrix} X(k,l) \\ X^*(-k,l) \end{bmatrix}$$

are input into transmitter 602 distorted signals $$\begin{bmatrix} P(k,l) \\ P^*(-k,l) \end{bmatrix}$$

will be transmitted over the channel 612. Additionally, due to channel distortion, $$\begin{bmatrix} Y(k,l) \\ Y^*(-k,l) \end{bmatrix}$$

will be received at receive block 606. The receive block 606 includes a receive IQ imbalance correction block 608 and a receiver 610. In various embodiments, the correction block 608 is used to correct for the IQ imbalance that will be caused by the receiver 610. For example, the received signals can be transformed to $$\begin{bmatrix} Z(k,l) \\ Z^*(-k,l) \end{bmatrix}$$

in correction block 608.

The transmit IQ distortion block 604 can be modeled as:

$$\begin{bmatrix} \mu_{tx} & v_{tx} \\ v_{tx}^* & \mu_{tx}^* \end{bmatrix}$$

and the receive IQ distortion block 608 can be modeled as:

$$\begin{bmatrix} \mu_{rx} & v_{rx} \\ v_{rx}^* & \mu_{rx}^* \end{bmatrix}.$$

Additionally, the channel can be modeled as:

$$\begin{bmatrix} C_{12}(k) & 0 \\ 0 & C_{12}^*(-k) \end{bmatrix}$$

Accordingly, the received signals are:

$$\begin{bmatrix} Z(k,l) \\ Z^*(-k,l) \end{bmatrix} = K_{rx2} C_{12} K_{tx1} \begin{bmatrix} X(k,l) \\ X^*(-k,l) \end{bmatrix}$$

Due to the nature of this distortion which causes Inter-Carrier Interference (ICI) in frequency domain, many algorithms jointly estimate and remove the effect of Tx-Rx IQ imbalance through performing some form of optimal, or suboptimal, frequency domain equalization based on error minimization metrics such as least mean squared (LMS).

In some embodiments, correction is performed at the receive block 606 using equalization. One example error minimization metric is:

$$K_{FD2} = (K_{rx2} C_{12} K_{tx1})^{-1}$$

$$= K_{tx1}^{-1} C_{12}^{-1} K_{rx2}^{-1}$$

using this error minimization metric the effects of IQ imbalance can be removed:

$$\begin{bmatrix} \hat{X}(k,l) \\ \hat{X}^*(-k,l) \end{bmatrix} = (K_{rx2} C_{12} K_{tx1})^{-1} K_{rx2} C_{12} K_{tx1} \begin{bmatrix} X(k,l) \\ X^*(-k,l) \end{bmatrix}$$

In some embodiments, the receive and transmit IQ imbalance can be separated, estimated and compensated for separately. For example, in one embodiment signals $$\begin{bmatrix} X(k,l) \\ X^*(-k,l) \end{bmatrix}$$

are pre-compensated for using a pre-compensation matrix $$\begin{bmatrix} \mu_{tx} & v_{tx} \\ v_{tx}^* & \mu_{tx}^* \end{bmatrix}^{-1}.$$

Accordingly the signals $$\begin{bmatrix} X'(k,l) \\ X'^*(-k,l) \end{bmatrix}$$

are transmitted using transmit block 600. The signals $$\begin{bmatrix} P'(k,l) \\ P'^*(-k,l) \end{bmatrix}$$

are transmitted over the channel 612.

Compensation occurs at the receiver block 606

$$\begin{bmatrix} \mu_{rx} & v_{rx} \\ v_{rx}^* & \mu_{rx}^* \end{bmatrix}^{-1}$$

and the signal received at the receiver 610

$$\begin{bmatrix} R(k,l) \\ R^*(-k,l) \end{bmatrix}$$

is processed to determine the correct signal:

$$\begin{bmatrix} R(k,l) \\ R^*(-k,l) \end{bmatrix} = K_{rx2}^{-1} K_{rx2} C_{12} K_{tx1} K_{tx1}^{-1} \begin{bmatrix} X(k,l) \\ X^*(-k,l) \end{bmatrix} = C_{12} \begin{bmatrix} X(k,l) \\ X^*(-k,l) \end{bmatrix}$$

In some embodiments, delay imbalance and other frequency dependent contributors, for example, e.g. in filters, can make IQ imbalance frequency selective. This results in different IQ distortion parameters on a per sub-carrier basis.

Figure 7:
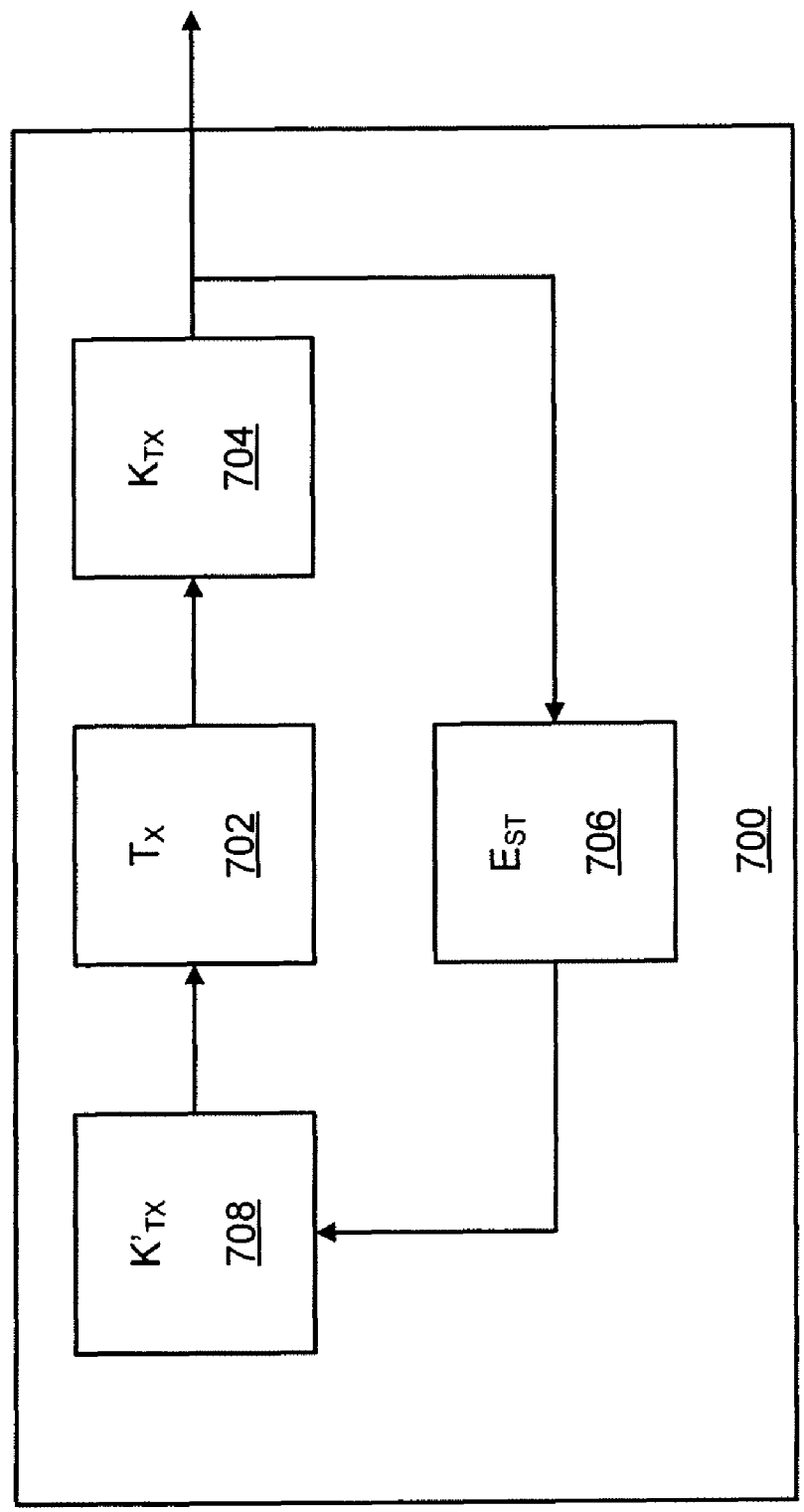
FIG. 7 is a diagram illustrating an example loopback in excessive frequency offset IQ imbalance estimation and compensation device in accordance with one embodiment of the disclosed method and apparatus.

As discussed above, some devices can simply estimate IQ imbalance using the systems and methods described herein. FIG. 7 is a diagram illustrating an example loopback in excessive frequency offset device 700. The device 700 of FIG. 7 does both IQ imbalance estimation and compensation in accordance with one embodiment. Referring now to FIG. 7, the device 700 includes a block 702 which represents a digital transmitter followed by the model of Tx IQ imbalance distortion 704. The transmitter is used to transmit signals. These signals will have some IQ imbalance due to variations in frequency or amplitude between the I and Q paths.

IQ imbalance for the signals can be corrected using correction block 708. The correction block performs the correction using information from an estimation block 706. As illustrated in FIG. 7, the cascade of transmitter 702 and IQ impairment model 704 is coupled to the estimation block 706. This block receives the signals when the device 700 is operating in loopback mode. This allows the device 700 to estimate IQ imbalance. Accordingly, it can provide correction parameters to the correction block 708 so that corrections can be performed by predistorting the transmitted signal.

Figure 8:
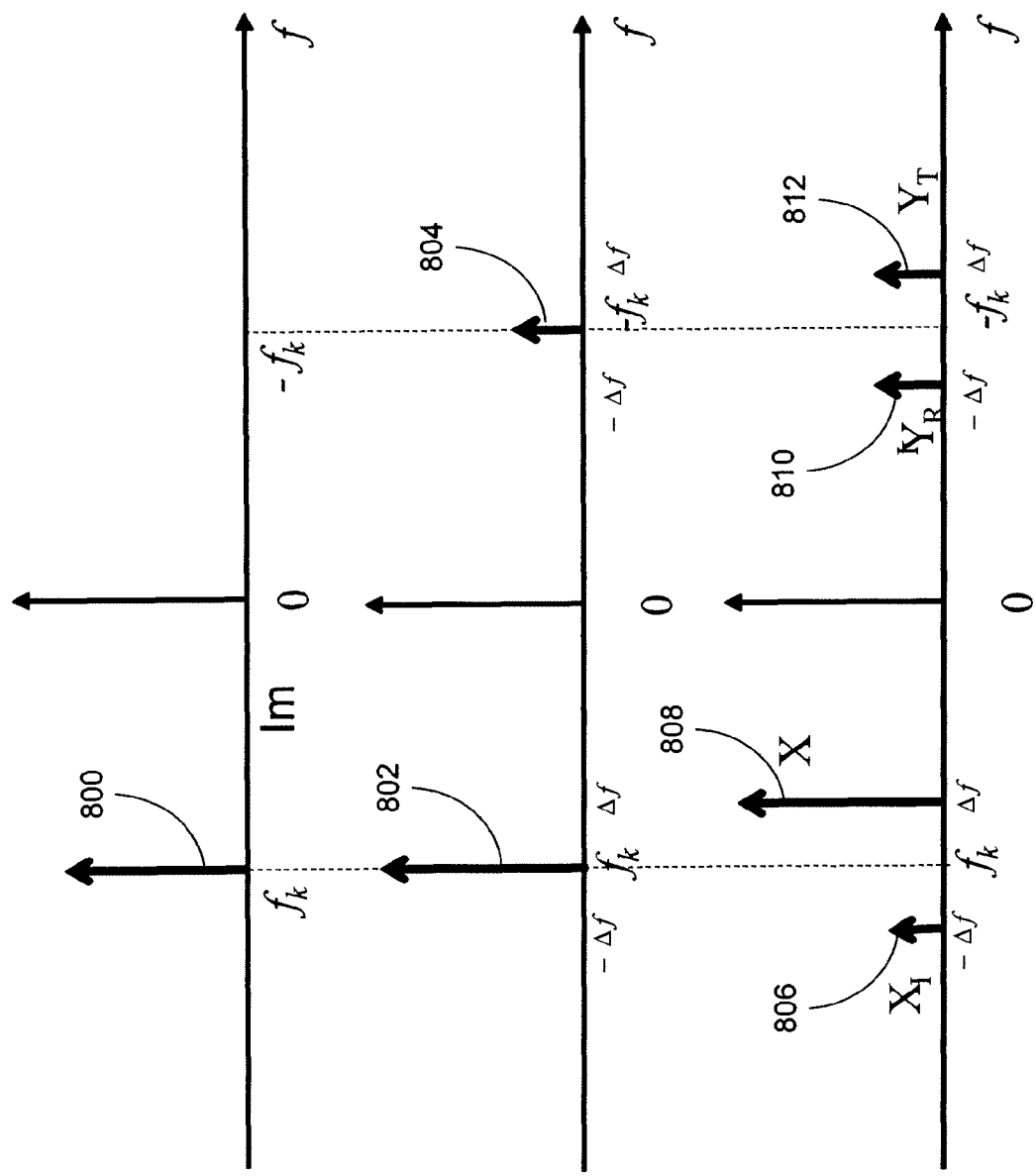
FIG. 8 is a diagram illustrating an example imbalance effect of a single tone.

FIG. 8 is a diagram illustrating an example imbalance effect of a single tone. Referring now to FIG. 8, tone 800 is transmitted from the transmitter as an IQ probe. If there is no frequency offset between transmitter and receiver, two tones 802 and 804 will be received. It can be shown that the tone 802 will have an amplitude and phase scaled by $(v_{rx}C^*_{-k}v^*_{tx} + \mu_{rx}C_k\mu_{tx})$ and the tone 804 has an amplitude and phase scaled by $(\mu_{rx}C_{-k}v_{tx} + v_{rx}C^*_k\mu^*_{tx})$.

Due to frequency offset in the IQ transmit device, tone 800 will be received as four tones 806, 808, 810 and 812 at the receive end. Tone 806 will be scaled by $(v_{rx}C^*_{-k}v^*_{tx})$, tone 808 will be scaled by $(\mu_{rx}C_k\mu_{tx})$, tone 810 will by scaled by $(v_{rx}C^*_k\mu^*_{tx})$ and tone 812 will be scaled by $(\mu_{rx}C_{-k}v_{tx})$. Accordingly, it can be shown that $$\frac{Y_T}{X_W} \approx \varepsilon_{tx} - j\phi_{tx} \text{ and } \frac{Y_R}{X_W^*} \approx \varepsilon_{rx} - j\varphi_{rx}.$$

Note that the above values are complex in general.

IQ imbalance can be classified into: amplitude imbalance and total phase imbalance. In some embodiments, the total phase offset is made up of frequency independent (constant) phase offset, sometimes simply referred to as phase offset and a frequency dependent (variable) phase offset, as a result of delay imbalance.

Amplitude imbalance is calculated using a single probe. In some embodiments, additional probes are used to update the amplitude imbalance calculation or to average multiple amplitude imbalance calculations in order to average noise out. Amplitude imbalance is calculated as the real part of image-to-tone ratio. The image-to-tone ratio is the real part of the desired component of the received image divided by the desired component of the received tone. Accordingly, the amplitude imbalance on the transmit side is approximately:

$$G_{tx} = \varepsilon_{tx} \approx \text{Re}\left(\frac{Y_T}{X_W^*}\right).$$

Similarly, the amplitude imbalance on the receive side is approximately:

$$G_{rx} = \varepsilon_{rx} \approx \text{Re}\left(\frac{Y_R}{X_W^*}\right).$$

Figure 9:
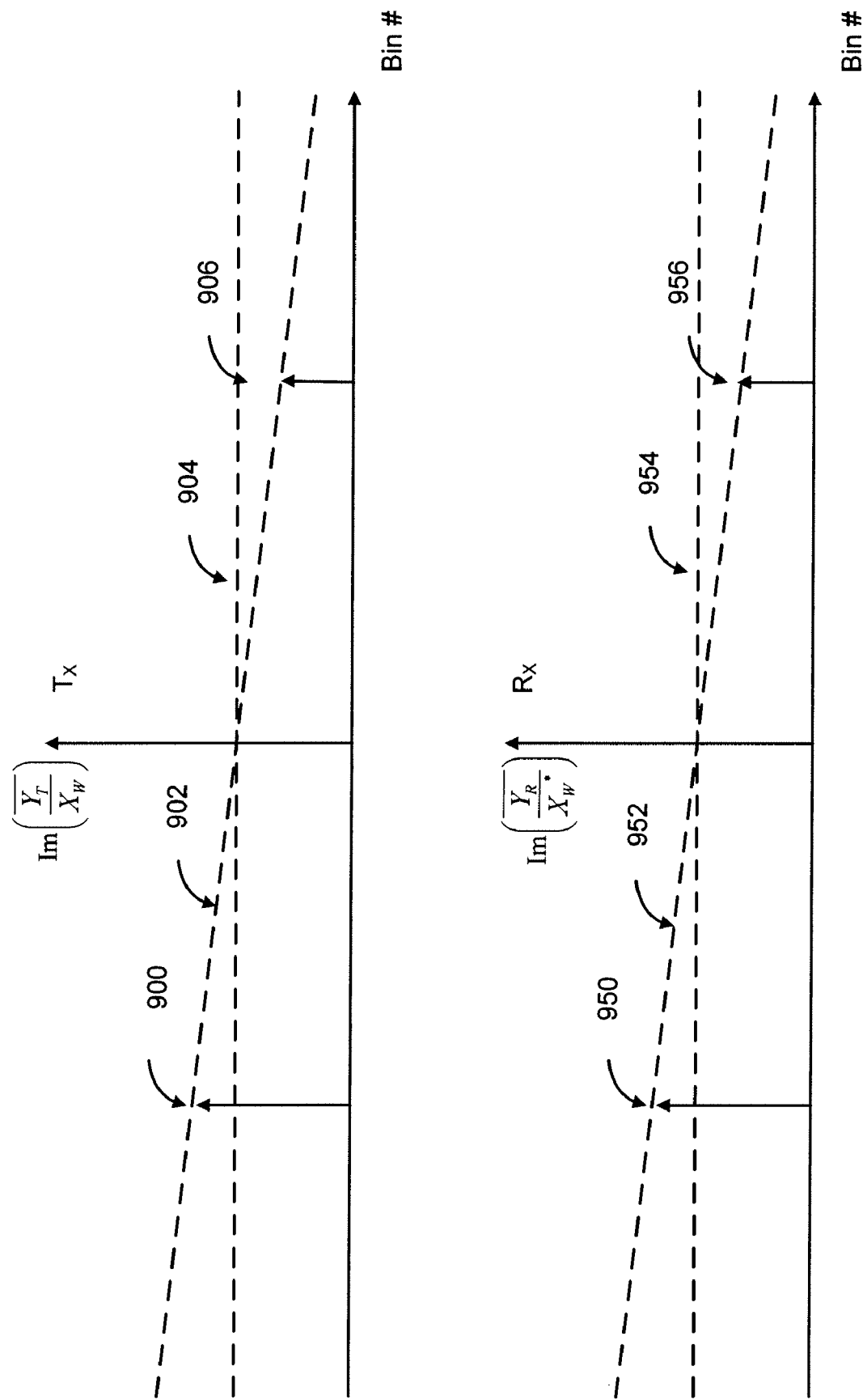
FIG. 9 is a diagram illustrating computation of IQ imbalance parameters.

FIG. 9 is a diagram illustrating computation of the IQ imbalance parameters for phase and delay imbalance. It is assumed that two tones were transmitted in bins $B_X$ and $B_{X1}$ and we have established the imaginary part of image to tone ratios as described above. This is done for each tone 900 and 906 and for both Tx as illustrated in the top diagram and Rx as illustrated in the bottom diagram. Referring now to FIG. 9, the calculation of phase and delay imbalance is discussed. The total phase imbalance is illustrated as a line between two components 900 and 906. The total phase offset includes a portion that varies with frequency 902 and a constant portion 904. Accordingly, the total phase offset, $P_T$, is equal to the variable phase offset, $P_V$, and the constant phase offset, $P_C$, or written as an equation: $P_T = P_V + P_C$. The variable portion is a linear function of the frequency (Bin number, B) and the slope D, such that: $P_V = DB$.

The total phase offset IQ imbalance on the transmit side is approximately:

$$P_{T_{tx}} \approx -\phi_{tx} \approx \text{Im}\left(\frac{Y_T}{X_W^*}\right).$$

This total phase offset IQ imbalance is made up of a contribution from delay IQ imbalance (defined by slope D) and the constant phase offset. As illustrated in FIG. 9, the IQ delay imbalance is the slope of line 902 and the constant phase offset is defined by the line 954. The delay IQ imbalance on the transmit side is equal to the slope, which is:

$$\text{Slope} = D_{tx} = \frac{\text{Im}\left(\frac{Y1_T}{X1_W^*}\right) - \text{Im}\left(\frac{Y_T}{X_W^*}\right)}{B_{X1} - B_X}.$$

The constant phase offset, referred to as the phase offset is: $P_{C_{tx}} = P_{T_{tx}} - B_X D_{tx}$ For the receive IQ imbalance, probe ratios 950 and 956 can be used to calculate IQ imbalance, including the total phase offset 952 and the constant phase offset 954. Similarly to the transmit imbalance equations:

$$P_{T_{rx}} \approx -\phi_{rx} \approx \text{Im}\left(\frac{Y_R}{X_W^*}\right)$$

$$\text{Slope} = D_{rx} = \frac{\text{Im}\left(\frac{Y1_R}{X1_W^*}\right) - \text{Im}\left(\frac{Y_R}{X_W^*}\right)}{B_{X1} - B_X}$$

$$P_{C_{rx}} = P_{T_{rx}} - B_X D_{rx}$$

Figure 10:
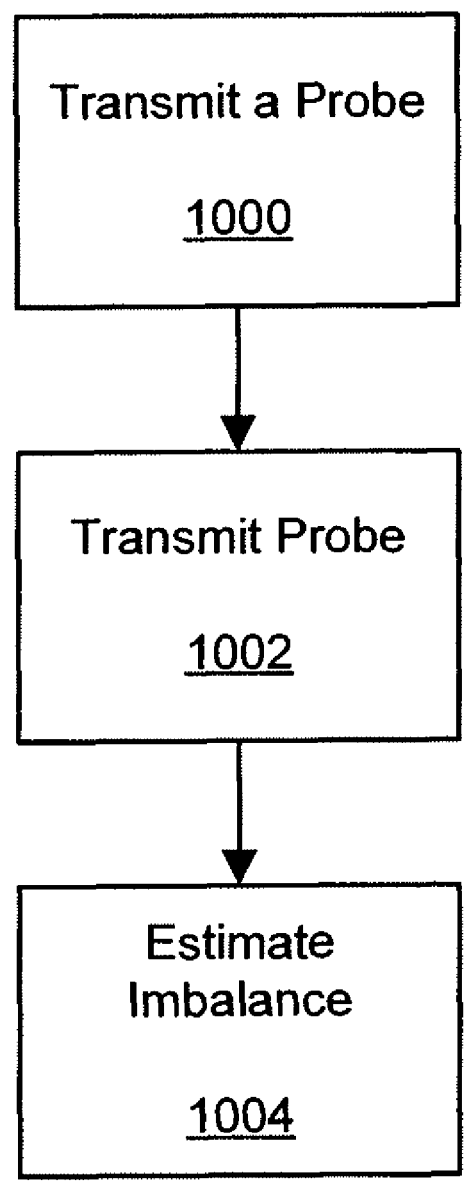
FIG. 10 is a flowchart illustrating a method in accordance with the systems and methods described herein.

FIG. 10 is a flowchart illustrating a method in accordance with the systems and methods described herein. Referring now to FIG. 10, IQ imbalance is computed by first transmit a probe in a step 1000. The probe may include M symbols, for example, M may be 4-8 symbols. In some embodiments, each symbol comprises a single tone per symbol at bin number $B_X$.

The bin number in some embodiments may be approximately −140. By transmitting a series of probes ratios and average over M for $Y_R/(X_W)^*$ and $Y_T/X_W$ can be determine.

A second probe is then transmitted in a step 1002. The probe includes N symbols. N is generally smaller than M when the frequency offset is negative, for example, N≅M−4. Conversely, N is generally larger than M when the frequency offset is positive, for example, N≅M+4 symbols. In some embodiments, each symbol constitutes a single tone per symbol. The bin number in some embodiments is approximately 140 (or −$B_X$). By transmitting a series of probes ratios and average over N, $Y_R/(X_W)^*$ and $Y_T/X_W$ can be determined.

In a step 1004, gain, phase and delay imbalances are computed (G, $P_C$, D or I, Q and D respectively) for both Tx and Rx. In various embodiments, gain, phase and delay imbalances are computed as described with respect to FIG. 9. Additionally, in some embodiments where the loopback channel cannot be approximated as constant, the systems and methods described herein can switch between positive and negative spectrum when transmit probes.

The systems and methods described herein can be used to compute IQ imbalance in a communication system. For example, these systems and methods may be applied to an OFDM communication system. In various embodiments, IQ imbalances can be corrected. For example, some embodiments use pre-distortion to correct for transmit IQ imbalance. Additionally, some embodiments use post distortion to correct for receive IQ imbalance. Other embodiments use both pre-distortion and post distortion so that transmit and receive IQ imbalance is corrected.

Figure 11:
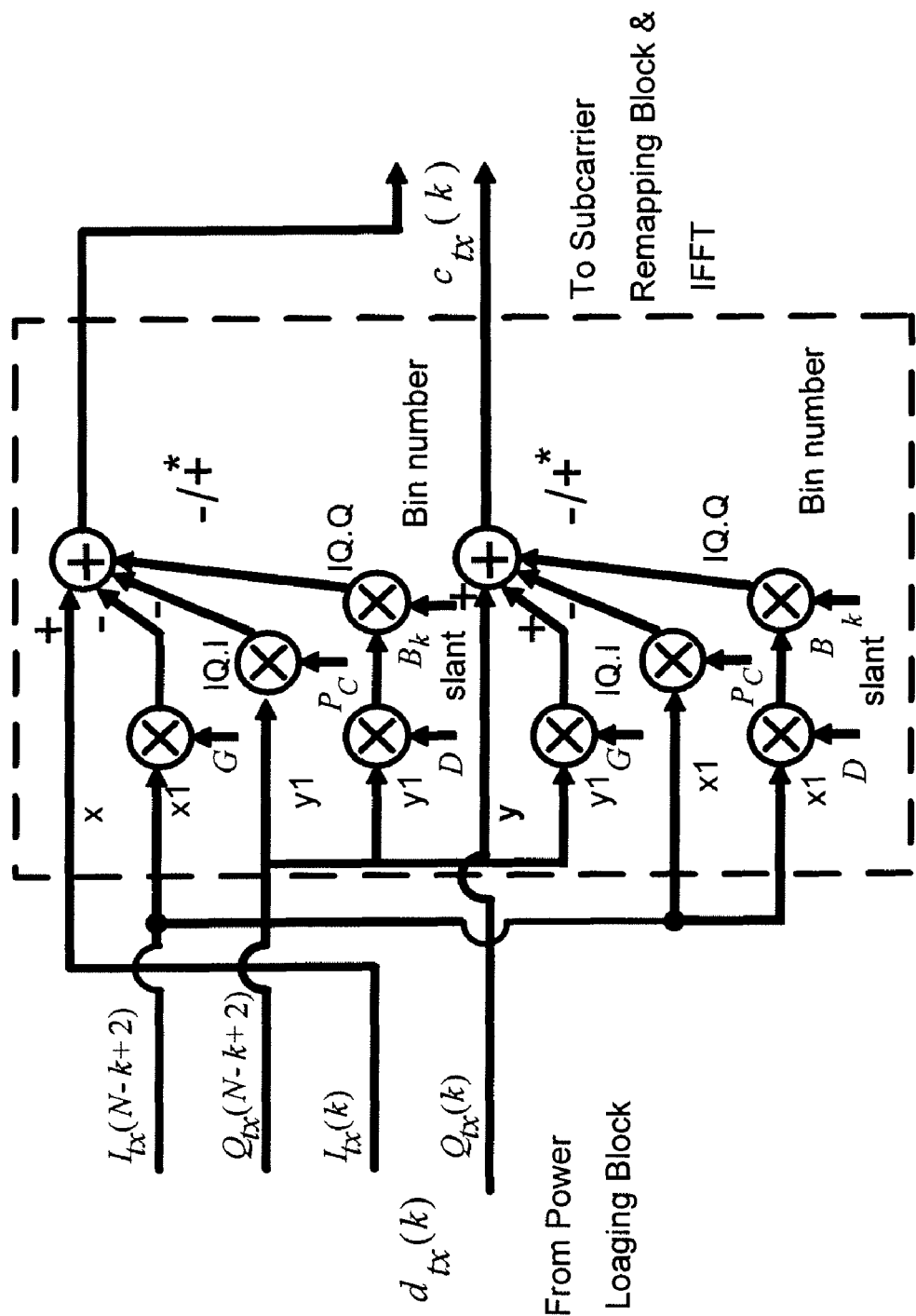
FIG. 11 is a diagram illustrating correction hardware that can be used for transmit pre-distortion.

Pre-distortion can be modeled as:

$$c_{tx}(k) \equiv d_{tx}(k) - \left(\frac{v_{tx}}{\mu_{tx}}\right) d_{tx}^*(-k)$$

$$\left(\overline{\frac{Y_A}{X_B}}\right) \approx \frac{v_{tx}}{\mu_{tx}} \approx \varepsilon_{tx} - j\varphi_{tx}$$

where N is the FFT size. FIG. 11 is a diagram illustrating correction hardware that can be used for frequency domain transmit pre-distortion in an OFDM system. As illustrated in FIG. 11, the correction hardware pre-distorts the on input I an Q values according to the estimated Gain, (G), Phase ($P_C$) and Delay (D) values. This predistortion is effectively equivalent to multiplication of the inverse of transmit IQ imbalance by the data.

An example of post distortion can be modeled by the following transform operating on the distorted data b'(t):

$$c(t) \equiv b'(t) - \left(\frac{v_{rx}}{\mu_{rx}^*}\right) b'^*(t)$$

$$\left(\overline{\frac{Y}{X^*}}\right) \approx \frac{v_{rx}}{\mu_{rx}} \approx \varepsilon_{rx} - j\varphi_{rx}$$

Figure 12:
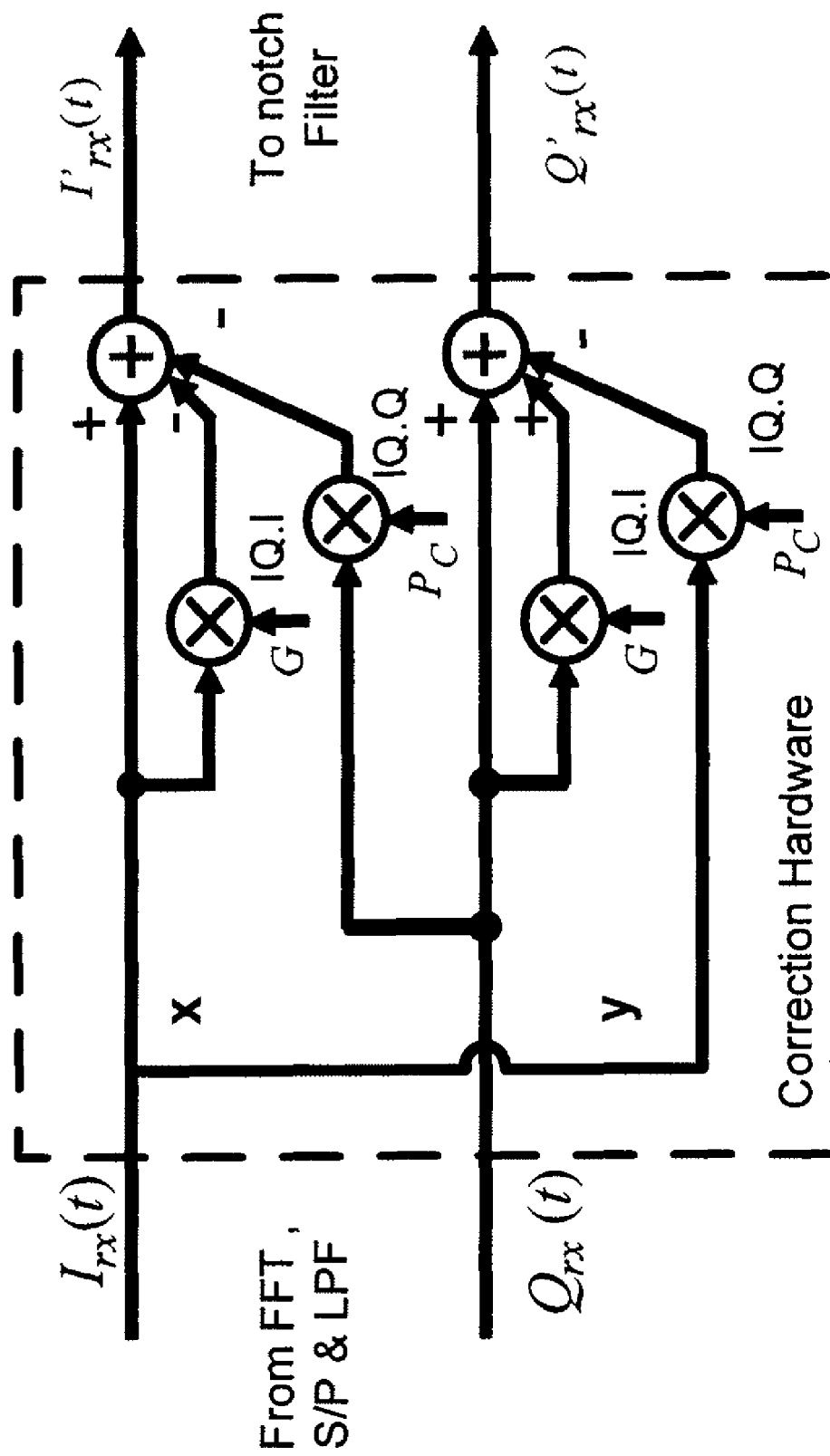
FIG. 12 is a diagram illustrating correction hardware that can be used for receive post distortion.

FIG. 12 is a diagram illustrating correction hardware that can be used for receive post distortion. As illustrated in FIG. 12, the correction hardware corrects the effect of receiver delay imbalance by effectively applying the inverse of receiver imbalance matrix to the down converted Data. Assuming no frequency dependent imbalance component, this example performs correction in time domain and prior to the FFT at the receiver. If the imbalance is frequency dependent the correction can be performed in frequency domain after the FFT. Pre-distortion and post distortion are generally understood by those of skill in the art and, for brevity, will not be discussed further here.

Figure 13:
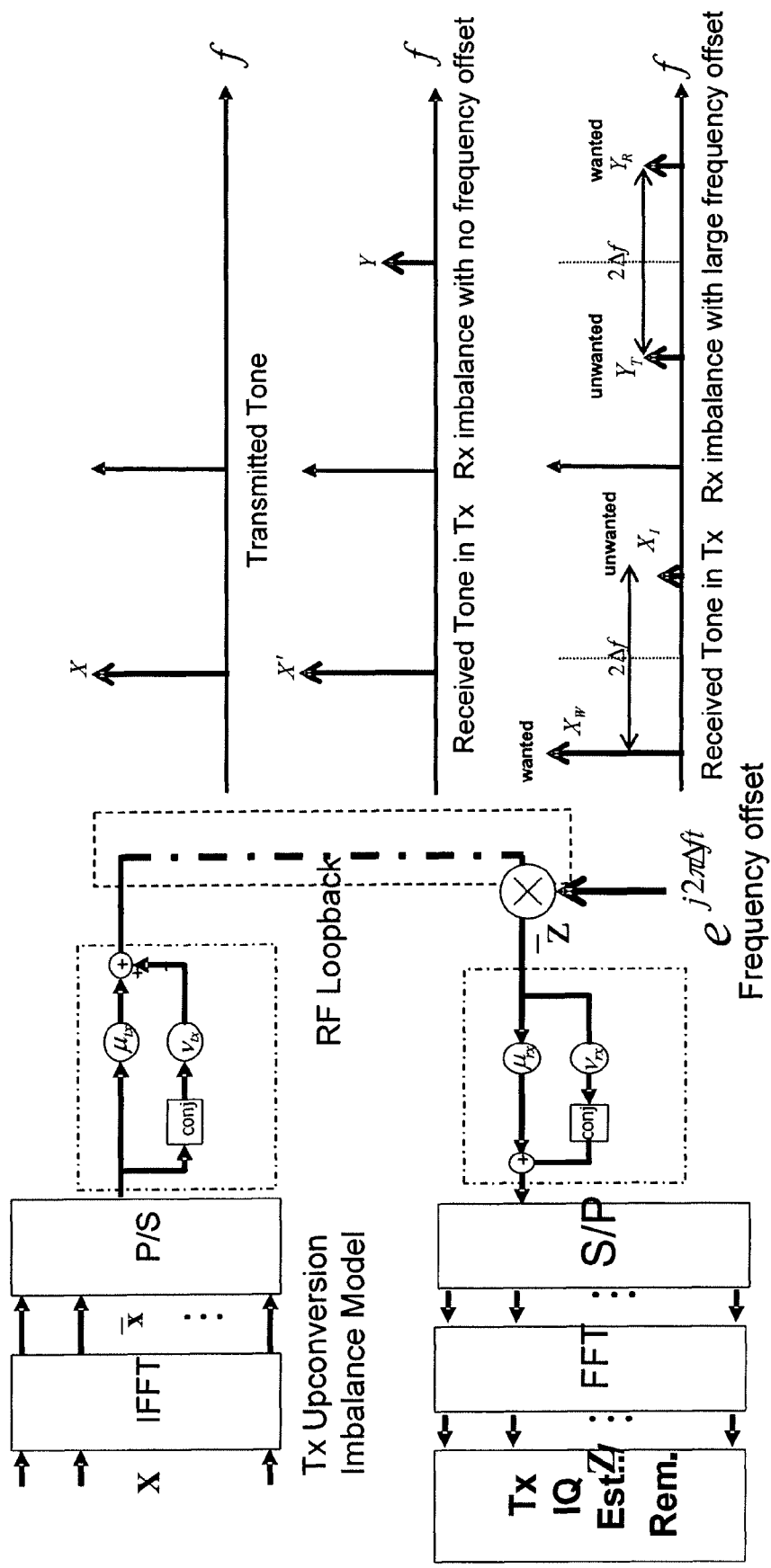
FIG. 13 is a diagram illustrating an example loopback system.

FIG. 13 is a diagram illustrating a loopback system. The diagram is used to discuss an example algorithm for channel dependent loopback for receive IQ imbalance computations. FIG. 13 is similar to FIG. 3; however, in this example the equations further illustrate the effects of a channel. Referring now to FIG. 13, the wanted signal is modeled as $X_W = \mu_{rx} C_k \mu_{tx} e^{-j\Delta\omega t}$ where $C_k$ models the channel, which in this example is not assumed to be 1. The unwanted signal is modeled as $X_I = v_{rx} C^*_{-k} v^*_{tx} e^{+j\Delta\omega t}$ where $C^*_{-k}$ models the channel. Similarly, $Y_R = v_{rx} C^*_k \mu^*_{tx} e^{j\Delta\omega t}$, again, the channel, $C^*_k$, in this example is not assumed to be 1. The unwanted signal is modeled as $Y_T = \mu_{rx} C_{-k} v_{tx} e^{-j\Delta\omega t}$ where $C_{-k}$ models the channel. Accordingly, $$\frac{Y_R}{X_W^*} = \frac{\mu_{tx}^* C_k^* v_{rx}^{j\Delta\omega t}}{[\mu_{rx} C_k \mu_{tx} e^{-j\Delta\omega t}]^*} = \frac{C_k^* v_{rx}}{C_k^* \mu_{rx}^*} = \frac{v_{rx}}{\mu_{rx}^*} \approx \varepsilon_{rx} - j\varphi_{rx}.$$

As will be clear to those of skill in the art, the receive IQ imbalance is generally channel independent. In other words, $$\frac{Y_R}{X_W^*}$$

does not depend on the channel. In general, $C_k$ can be complex (having real and imaginary components.)

Figure 14:
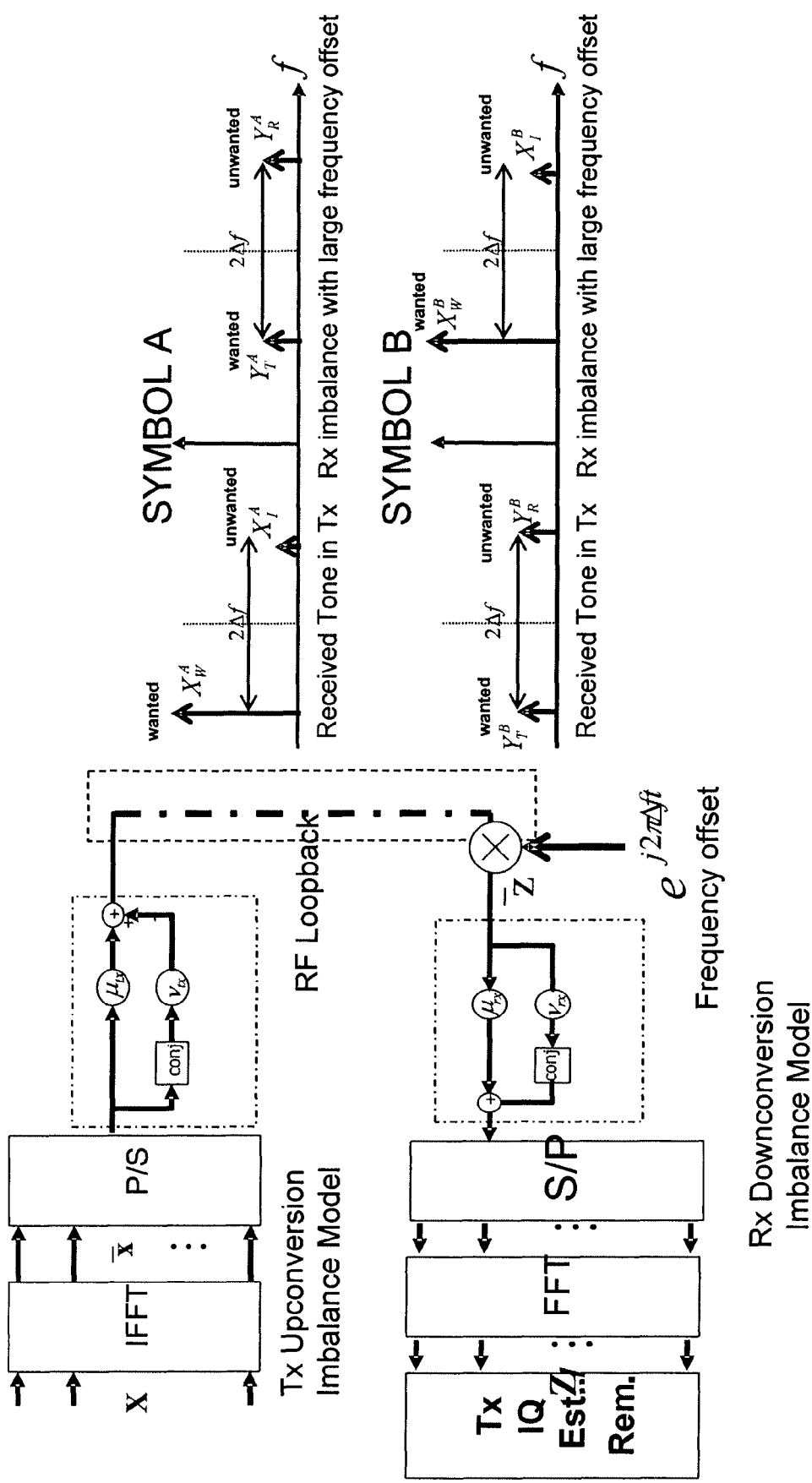
FIG. 14 is a diagram illustrating an example loopback system.

FIG. 14 is a diagram illustrating a loopback system. The diagram is used to discuss an example algorithm in which two symbols are transmitted in order to perform a transmit IQ imbalance computation when the loopback channel is not constant ($C_k \neq 1$). In order to eliminate the effect of the channel the ratio of the image of a first symbol to the tone of a second symbol is calculated. For example, in some embodiments, symbol type "A" represents a transmit at a negative tone and symbol type "B" represents a transmit at a positive tone. As illustrated in FIG. 14, the ratio of symbol A to tone B is calculated. In various other embodiments the ratio of symbol B to tone A is calculated.

The wanted portions of symbol A are modeled as $X_W^A = \mu_{rx} C_k^A \mu_{tx} e^{-j\Delta\omega t}$ and $Y_T^A = \mu_{rx} C_{-k}^A v_{tx} e^{-j\Delta\omega t}$. The unwanted portions of symbol A are modeled as $X_I^A = v_{rx} C^*_{-k}{}^A v^*_{tx} e^{+j\Delta\omega t}$ and $Y_R^A = v_{rx} C^*_k{}^A \mu^*_{tx} e^{j\Delta\omega t}$. From these signals it can be shown that $$\frac{Y_T^A}{X_W^B} = \frac{\mu_{rx} C_{-k}^A v_{tx} e^{j\Delta\omega t}}{\mu_{rx} C_k^B \mu_{tx} e^{-j\Delta\omega t}} = \frac{C_k^B v_{tx}}{C_k^B \mu_{tx}} = \frac{C_k^B v_{tx}}{C_k^B \mu_{tx}} \approx \varepsilon_{tx} - j\varphi_{tx}$$

since $C_{-k}^A = C_k^B$.

While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The disclosed method and apparatus is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for estimating IQ imbalance in a communication system comprising:
configuring a device to perform a self-characterization over an RF loopback circuit;
transmitting a probe over the RF loopback circuit, the loopback comprising a frequency offset such that an image related to one IQ imbalance effect is separated from an image related to another IQ imbalance effect; and
estimating an imbalance by calculating an image ratio ($Y_T/X$) based on the probe, the imbalance comprising a delay imbalance, wherein the delay IQ imbalance on the transmit side is equal to the slope, which is: Slope=$D_{tx}$ and wherein the constant phase offset, referred to as the phase offset is: $P_{Ctx}=P_{Tx}-B_xD_{tx}$.

2. The method of claim 1, wherein the imbalance estimate includes a in imbalance.

3. The method of claim 1, wherein the imbalance estimate includes a phase imbalance.

4. The method of claim 1, wherein the imbalance estimate includes a transmitter IQ imbalance estimation.

5. The method of claim 1, wherein the imbalance estimate includes a receiver IQ imbalance estimation.

6. The method of claim 1, further comprising correcting for the imbalance.

7. The method of claim 1, wherein the probe comprises a plurality of symbols.

8. The method of claim 1, wherein the frequency offset comprises 64 bins.

9. The method of claim 1, wherein the frequency offset is large enough so that the images do not interfere with each other.

10. A communication device comprising:
a memory configured to store instructions;
a processor, coupled to the memory and configured to execute instructions, the instructions causing the processor to:
configure a device to perform a self-characterization over an RF loopback circuit;
transmit a probe over the RF loopback circuit, the probe comprising a frequency offset such that an image related to one IQ imbalance is separated from an image related to another IQ imbalance; and
estimate an imbalance by calculating an image ratio ($Y_T/X$) based on the probe, the imbalance comprising a delay imbalance, wherein the delay IQ imbalance on the transmit side is equal to the slope, which is: Slope=$D_{tx}$ and wherein the constant phase offset, referred to as the phase offset is: $P_{Ctx}=P_{Tx}-B_xD_{tx}$.

11. The communication device of claim 10, wherein the imbalance estimate includes a gain imbalance.

12. The communication device of claim 10, wherein the imbalance estimate includes a phase imbalance.

13. The communication device of claim 10, wherein the imbalance estimate includes a transmitter IQ imbalance estimation.

14. The communication device of claim 10, wherein the imbalance estimate includes a receiver IQ imbalance estimation.

15. The communication device of claim 10, further comprising correcting for the imbalance.

16. The communication device of claim 10, wherein the probe comprises a plurality of symbols.

17. The communication device of claim 10, wherein the frequency offset comprises 64 bins.

18. The communication device of claim 10, wherein the frequency offset is large enough so that the images do not interfere with each other.

* * * * *